US007156531B2

(12) United States Patent
Rudi

(10) Patent No.: US 7,156,531 B2
(45) Date of Patent: Jan. 2, 2007

(54) PARABOLIC CONCENTRATOR

(76) Inventor: Bertocchi Rudi, 48 Medinat Hayehudim st., Herzliya 46766 (IL)

( * ) Notice: Subject to any disclaimer, the term of this patent is extended or adjusted under 35 U.S.C. 154(b) by 98 days.

(21) Appl. No.: 10/769,436

(22) Filed: Jan. 30, 2004

(65) Prior Publication Data

US 2005/0168852 A1 Aug. 4, 2005

(51) Int. Cl.
*G02B 5/10* (2006.01)
*G02B 5/08* (2006.01)
*G02B 7/182* (2006.01)

(52) U.S. Cl. .................... 359/853; 359/883; 428/912.2

(58) Field of Classification Search ................ 359/850, 359/851, 853, 883, 884; 428/912.2
See application file for complete search history.

(56) References Cited

U.S. PATENT DOCUMENTS 4,842,398 A * 6/1989 Ducassou ................... 359/883
5,104,211 A * 4/1992 Schumacher et al. ....... 359/853
5,443,884 A * 8/1995 Lusignea et al. ........... 428/116
6,206,531 B1 * 3/2001 Williams et al. ............ 359/883
6,739,729 B1 * 5/2004 Blackmon et al. .......... 359/846

* cited by examiner

*Primary Examiner*—Mark A. Robinson
(74) *Attorney, Agent, or Firm*—Fleit Kein Gibbons Gutman Bongini & Bianco; Martin fleit; Paul D. Bianco

(57) ABSTRACT

The present invention discloses a parabolic dish-shaped electromagnetic wave front concentrator composed of a plurality of petal like identical interchangeable segments. The segment are comprised of an anterior concave layer made of a reflective material, an anterior skin made of ferrous material, an inner core made of a low density foam material and a posterior skin made of ferrous material covered by a protective coating such as zinc.

The present invention further discloses a method of manufacturing the segments, by means of sandwich construction, of the parabolic dish-shaped electromagnetic wave front concentrator. The manufacturing method applies predetermined amount of uniformly distributed pressure by means of a vacuum membrane placed on the posterior surface of the segment which is positioned on an exact male mold surface. The components constituting the sandwich construction are mutually affixed by means of adhesive coats.

21 Claims, 7 Drawing Sheets

PARABOLIC CONCENTRATOR

FIELD OF INVENTION

This invention relates to a large areas three-dimensional, parabolic concentrator, which may be used for radiation energy apparatus requiring either a high level of concentration of incident electro magnetic irradiation or a high energy content of said irradiation on the receiving apparatus. The invention is particularly directed toward the art of concentrating electromagnetic radiation, but may also be used in other fields of applications, for instance: acoustics. The present invention also relates to a method of manufacturing large area concentrators with substantially small surface errors at low specific costs.

BACKGROUND OF THE INVENTION

Parabolic, three-dimensional, concentrators are commonly used for concentrating electromagnetic irradiation onto collecting apparatuses. Large area concentrators, typically with a diameter exceeding 15 m. are required when the irradiation energy is either relatively weak or a large absolute energy content is required for the purpose of the collecting apparatus. Present art large area, three-dimensional, parabolic concentrators require complex and massive support structures to ensure the structural integrity and reflective surface accuracy of the concentrator, because of stresses and deformations induced by combinations of inertia, wind and thermal load. The support structure does not either directly or indirectly contribute to the purpose of the concentrator; it only augments the specific cost, complexity and weight of the device. Whilst military and space applications do not necessarily require low specific cost, for civilian applications, energy and telecommunication applications in particular, low specific costs are paramount for technology implementation. From a further aspect, existing large area concentrators are not specifically designed for long range transportation in standardized containers, which further increase the device's specific cost due to unique packaging, handling and transportation methodologies. Experience has shown that susceptibility to damage during shipping, especially loading and unloading, is quite common. Further, the weight of existing large area concentrators is exceedingly high, typically 50 to 100 kilo per square meter. This fact implies that even if the concentrator is manufactured in segments, the handling, assembly and replacement of a single sub-unit requires dedicated support equipment that typically may increase the initial and operational cost of the system. Further cost, or, alternatively, loss of data information, can arise because of prolonged downtime in replacing defective reflector segments. Furthermore, the present art of manufacturing large area concentrator segments in a non-repetitive procedure requires individual matching, identification and packing of all said parts and sub-parts, which at assembly prolong the setup time and complexity; thus further inflating system costs. From a further aspect, the prospect of mobility of large area concentrators has been considered as prohibitive due to the complexity, risk and time required to disassemble, transport and assemble the unit when all parts require individual matching. This drawback has impaired the operation or many electronic communications and radar systems which necessitate a concentrator system that is readily dispatchable and can be operational within typically a few hours after arriving at the designated site. Large area concentrators, especially static, are susceptible to damages due to weather extremes, such as strong winds and hail. Lack of an autonomous automated control station, with real time information of local weather, prevents placing the concentrator in a predetermined optimal position, minimizing the risk of environmentally inflicted damage be it either wind, snow, hail or a combination thereof. The lack of such a protective control algorithm mode further inflates the system's operational cost due to weather-induced damages or in the extreme case—a total system loss.

For many years different methods have been utilized to form concentrators having a parabolic or quasi-parabolic shape. Small area concentrators, typically with an area less than 3 $m^2$, are traditionally manufactured as a single unit either by press forming a metal sheet or by different variations of molding. Large area concentrators have typically been manufactured in "pie" slice sub segments or a multitude of facets. Said segments have little or no inherent structural strength or stability, thus requiring a complex matrix or truss members in order to achieve the structural strength and rigidity required sustaining inertia and winding loads whilst maintaining necessary reflective surface accuracy. The multitude of said structural support parts and sub-parts used in the construction of the concentrator, augment unnecessarily the unit cost, complexity, time to assemble and total overall weight, with no contribution to the primary function of the system—concentrating electromagnetic irradiation onto a receiving apparatus.

These and various other problems were not satisfactorily resolved until the emergence of the present invention.

SUMMARY OF THE INVENTION

It is therefore the principal object of this invention to provide a novel large area true parabolic concentrator by a specific embodiment to essentially eliminate the aforementioned problems of conventional prior art large area concentrators. The present invention aims to provide a true three dimensional parabolic concentrator which has a low specific cost, lends itself to mass production manufacturing techniques, exhibits fall mutual part interchangeability, is transportable within a standard size shipping container and can be in-situ field assembled in a fraction of the time and expense of existing large area concentrators.

The present invention thus provides in a first aspect a parabolic dish-shaped electromagnetic wave front concentrator composed of a plurality of petal like, identical and interchangeable segments, each segment comprising, in compact overlying position:

- an anterior concave layer made of a reflective material, an anterior skin made of structural material having a Modulus of Elasticity exceeding 150 GPa (such as ferrous material),
- an inner core made of a low density foam material (such as expanded or extruded polystyrene),
- a posterior skin made of structural material having a Modulus of Elasticity exceeding 150 GPa (such as ferrous material) covered by a protective coating such as zinc; and
- means for assembling said segments to each other.

In accordance with the present invention, the thickness' of the anterior and posterior skins and the inner low density core are determined by accounting for the surface's structural deformations and stress levels at maximum operational loads, while still meeting the requirement of optical accuracy and comprehensive safety margin with regards to maximum structural stress levels. The process or determining the optimal skin and core thickness is typically accomplished by coupling structural analysis Finite Element Analysis codes with optical ray tracing codes, using aerodynamic, thermal and inertia loads, mechanical material properties and optical surface properties as inputs to said computer codes.

It may be appreciated from the foregoing description that the resulting concentrator unit is of substantially reduced weight and cost, while maintaining maximally required surface accuracy. In yet another aspect, the low-density inner core can optionally comprise integral hollow channels for further weight reduction, or be made of a honeycomb structure (such as Nomex, cardboard or aluminium).

The layered segments are mutually affixed by means of mechanical fasteners and/or adhesives at abutting ribs alongside each segment's radial edge. Said abutting ribs being of a height exceeding the thickness of the respective segment so that a marginal portion of the rib extends beyond the surface of the anterior and posterior skins, thus providing ample surface of interface for the aforementioned mechanical fasteners. It may also be noted that each of said segments is interchangeable, whereby a damaged segment may be replaced in-situ requiring only minimal system downtime, thus minimizing operational losses and costs.

According to the present invention the concentrator may further comprise:

a biaxial drive unit for continuously aligning the concentrator's optical axis for attaining an optimal position relative to an incident energy wave front, the axis's azimuth and elevation acquired by position sensors, a vertical support structure, either cantilever, or wire braced, which sustains all static and dynamic loads at the most extreme weather conditions. Additionally, the said support structure is of low cost and interfaces with the biaxial drive unit by a circular flange, a radiation energy receiving and converting apparatus placed in, or in the vicinity of, the paraboloid's focal plane, a local weather station measuring in real time, or acquiring from a remote source, the ambient meteorological conditions, particularly the wind speed/direction and determining if hailing conditions prevail, a processing unit, which controls the continuous, tracking motion of the concentrator and determines the parameters for driving the concentrator into protective position when predefined limiting weather conditions are exceeded. Additionally, said processing unit reports, either by fixed link or wireless, the relevant operational system data to a control station, said control station being either a local or remote host or an Internet URL.

It is a further object of this invention to provide a method of manufacturing said dish shaped parabolic concentrator, meeting all the requirements with regards to cost, accuracy, mobility and manufacturability. Said methodology comprising the steps of:

a. applying an electromagnetic reflective surface layer, which may be a glass/silver matrix, onto a male mold's outwardly surface, b. applying a plurality of anterior, overlapping, thin ferrous metal skin panels to the above reflective surface by means of an adhesive, if said reflective surface is not ferrous, c. applying a low density core, having a predetermined thickness and plan-form, by means of an adhesive to the backside of the aforesaid thin ferrous anterior skins for the purpose of increasing the moment area of inertia, d. applying a plurality of posterior, overlapping, thin ferrous sheet metal skin panels to the low density core by means of an adhesive, said metal skins having an outwardly exposed corrosion protective coating, which may be zinc, e. affixing permanently radially butting ribs to the radial butting edges of the created sandwich construction, by means of an adhesive, f. applying a predetermined amount of uniformly distributed pressure by means of a membrane placed on the posterior ferrous surface, and further subjected to vacuum on the side directed to the aforesaid posterior surface and to a predetermined air pressure on the outwardly side; and g. curing the sandwich construction referenced in a–f at predetermined ambient temperature and time.

h. Above mentioned mate mold surface, used in the herein above described method conforms precisely to the curvature distribution corresponding to the predetermined surface parameters of the concentrator surface, said mold being manufactured to high a degree of accuracy by means of computer controlled machinery.

Other advantages of the present invention relative to present art will be apparent from the particular description of the preferred embodiment. The invention will be understood best from the following description when read in conjunction with the accompanying drawings.

DETAILED DESCRIPTION OF THE PREFERRED EMBODIMENT

Figure 1:
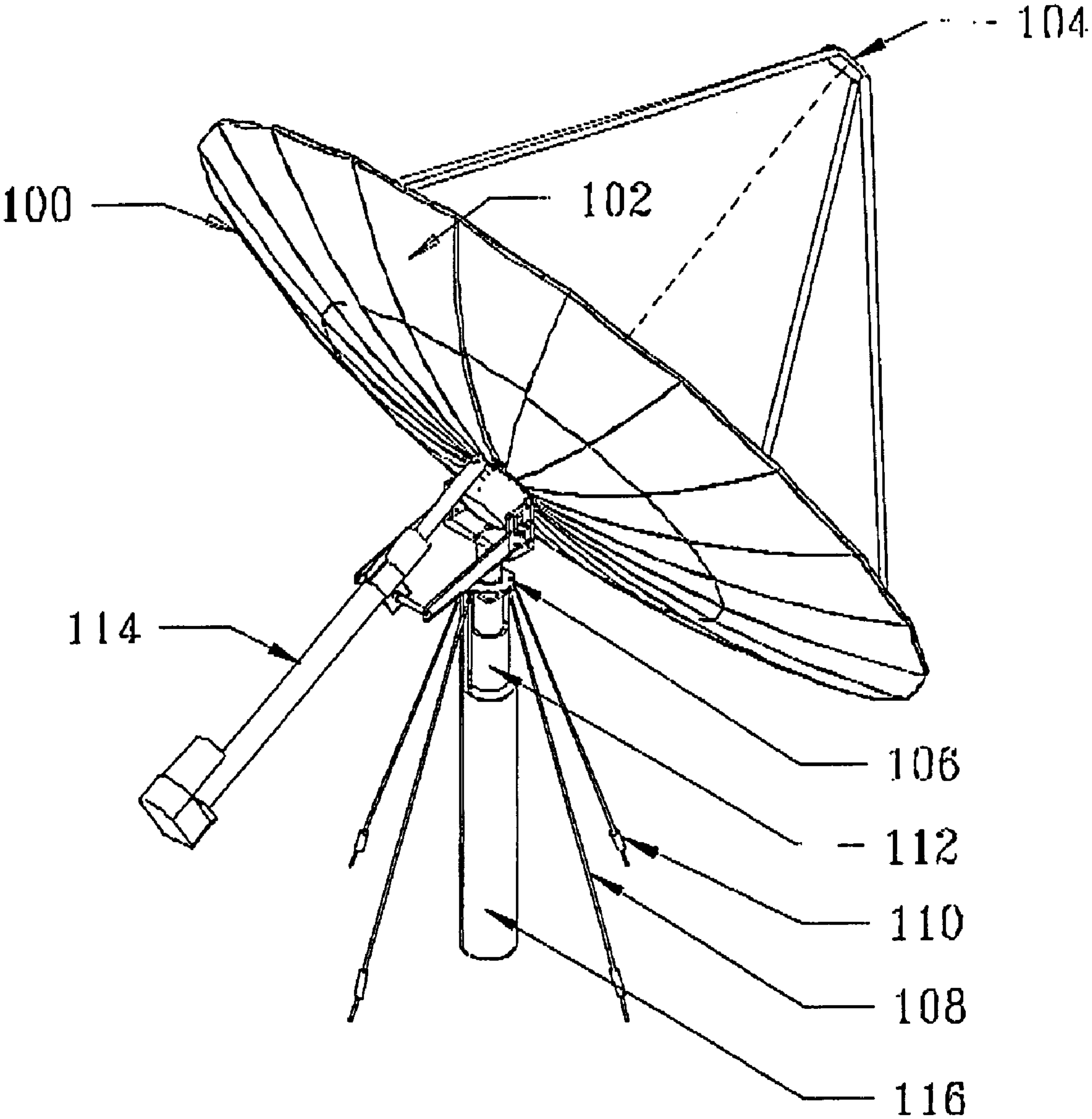
FIG. 1 is a perspective view of the paraboloidal concentrator.

Referring now to FIG. 1, which is a perspective view of the paraboloidal concentrator. The true parabolic concentrator is designated 100, and is comprised of a plurality of petal-like sections 102. The sections 102 are identical and interchangeable each section having radial edges sub tending the same angular fraction.

The concentrator section 102 describes a fraction of a true paraboloid, with the aforesaid surface being curved in both the radial and tangential direction. The concave outward panel of the concentrator assembly fulfills the dual role of both directing the incident energy wave front onto the energy converting apparatus 104 and sustaining structural stresses due to mass, inertia, thermal and aerodynamic Forces and moments. The sections 102 may typically be comprised of structural material having a Modulus of Elasticity exceeding 150 GPa (preferably ferrous sheet metal) anterior and posterior skins with a low-density spacing inner core. The anterior surface of said panel may comprise of an outwardly polished or coated surface or of a mirrored glass coating applied to the front sheet metal surface. The optimal thickness of said skin panels can be determined from safety margins of deformation effects due to potential structural loads and from optical performance limitations due to said structural deformations. The deformation effect is calculated in accordance with numerical analysis of reflective surface deformation due to potential structural loads. The optical performance limitations are set in accordance with ray tracing analysis of potential deformations. It may be appreciated that a surface slope error of typically 2 milliradians may be achieved comprising a 15 m. diameter concentrator under normal operating conditions whilst utilizing panel skins with a typical thickness of 1.0 mm and a core thickness of 170 mm. The energy concentrator 100 is supported by a central mast 116 that is affixed to a lower interface flange, which is embedded in the concentrator support structure 106. The central mast 116 may be further supported and stabilized by typically four external brace wires 108, essentially laying equiangular on a conical surface with the base at the support structure 106. The brace wires 108 may be tensioned by means of turnbuckles 110.

Bi-axial pivotal positioning of the concentrator 100 is typically comprised of an electrical jack 114 for elevation positioning and an electrical geared motor 112, for azimuthal positioning. An encoder (not shown) located on the shaft of the azimuth drive determines the relative position of the concentrator with respect to a known fixed location, while an electronic clinometer (not shown) determines the elevation of the optical axis. The readings of said sensors are continuously streamed to the LPU 704 for the purpose of precise tracking of the radiation source.

Figure 2:
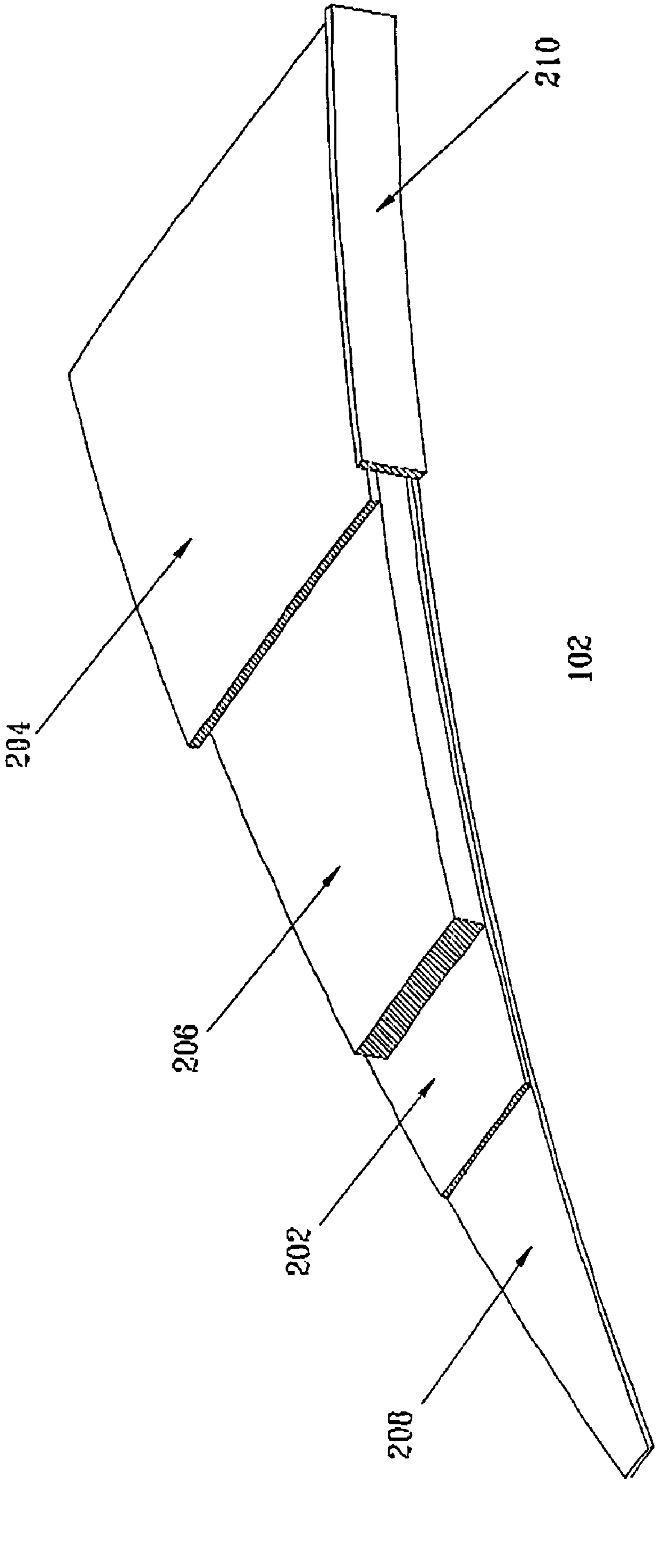
FIG. 2 is a cutaway perspective view of the essential components comprising the concentrator segment 102.

Referring now to FIG. 2, which is a cutaway perspective view of the essential components comprising the concentrator segment 102.

The true paraboloid energy concentrator 100 consists of a plurality of individual segments 102. It is particularly noteworthy that the segments 102 are mutually interchangeable and are formed to an accuracy of typically better than +/−0.50 mm. The size of the concentrator segment 102 in the preferred embodiment is constrained by the requirement that the plurality of segments 102 which comprise the concentrator 100 fit into a standard 40 ft high-cube container, which is of major importance for reducing shipping costs. It is noted that a typical 15-meter diameter concentrator comprises of 20 segments, whilst a larger diameter concentrator typically would comprise of more segments in order to fit into said standard size container.

As illustrated, this said segment can be described as a thick sandwich panel comprising two skin layers made of structural material having a Modulus of Elasticity exceeding 150 GPa (preferably of ferrous material) 202, 204 separated by a inner core made of low density foam 206, typically expanded or extruded polystyrene. An anterior concave reflective surface 208 is provided preferably laminated by one layer of silver coated glass mirror for applications where the electromagnetic wave energy is in the visible range. The foam core 206 is permanently bonded to the anterior surface 202 and the posterior skin surface 204. The thicknesses of said skin panels 202, 204 and foam core 206 are determined by numerical Finite Element Analysis (FEA) of stresses and deflections comprising constraints of material stress margins and surface slope deviations, constrained to meet structural safety margins at maximum operational load conditions combined with optical requirements for maintaining energy concentration properties in the target plane of the energy converting apparatus 104. By way of example, a concentrator 100 comprising a diameter of 15 m. may have a surface slope accuracy better than 2 milliradians at operational load conditions sustaining a dynamic pressure of 140 N/m2 by virtue of a foam core thickness of 170 mm and anterior and posterior ferrous skin thicknesses of 1.0 mm.

It may be further noted that the principal task of the foam core 206 is to increase the area moment of inertia of said concentrator 100, whereby the shear stresses due to forces and moments flow between the stressed anterior and posterior surfaces 202, 204. Hence, said foam core can optionally be manufactured with integral hollow channels to further reduce the weight and cost of the parabolic concentrator 200. In yet a further option, the roam core may be substituted by a honeycomb like structure, typically Nomex, cardboard or aluminium, permanently bonded to the stressed ferrous surfaces 202, 204. To minimize electro chemical reactions in the structure, the said exposed ferrous surfaces may be coated with a protective layer, typically zinc.

Figure 3:
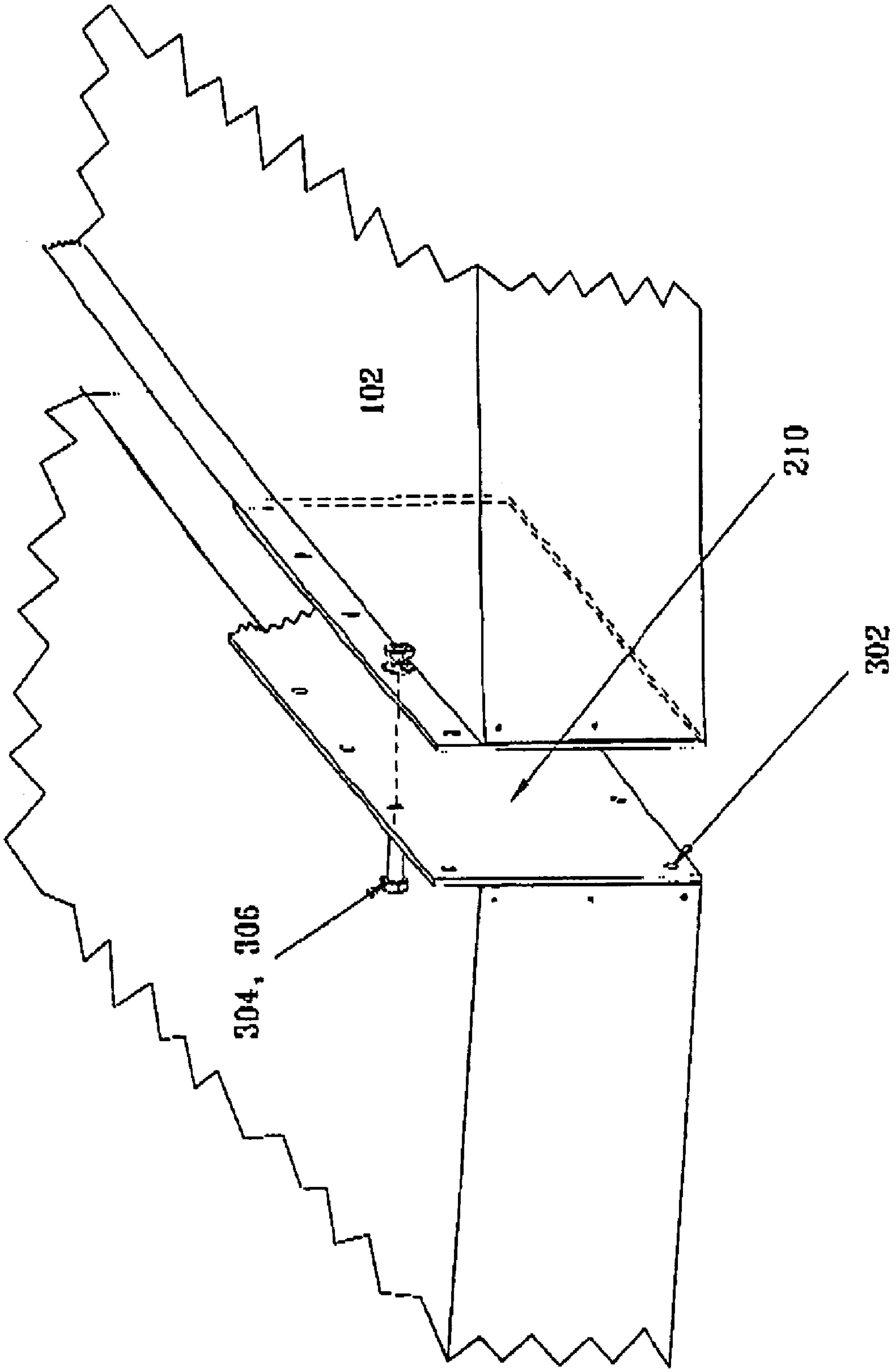
FIG. 3 shows a perspective view of the mating assembly procedure of the individual segments constituting the concentrator.

Referring now to FIG. 3, which shows a perspective view of the mating assembly procedure of the individual segments constituting the concentrator, whereby each individual segment 102 is assembled to its neighbor by means of the butting metal rib 210 via the upstanding perforated flange protruding outwardly beyond both the segment's 102 convex and concave surfaces. The perforations in the abutting rib 210 are in spaced intervals, produced by either laser cutting or CNC punching, ensuring an accuracy facilitating the assembly of the concentrator 100 by randomly chosen segments 102. The individual segments are mutually secured by means of threaded fasteners 304 if the concentrating system is predicted to be mobile, or alternatively by blind fasteners 306 for a stationary operation. It should be noted that blind fasteners 306 can be replaced with relative case by drilling them out to facilitate replacement of the segments 102. Whilst assembling the plurality of segments in-situ, their relative position is affixed by an assembly jig (not shown).

Figure 4:
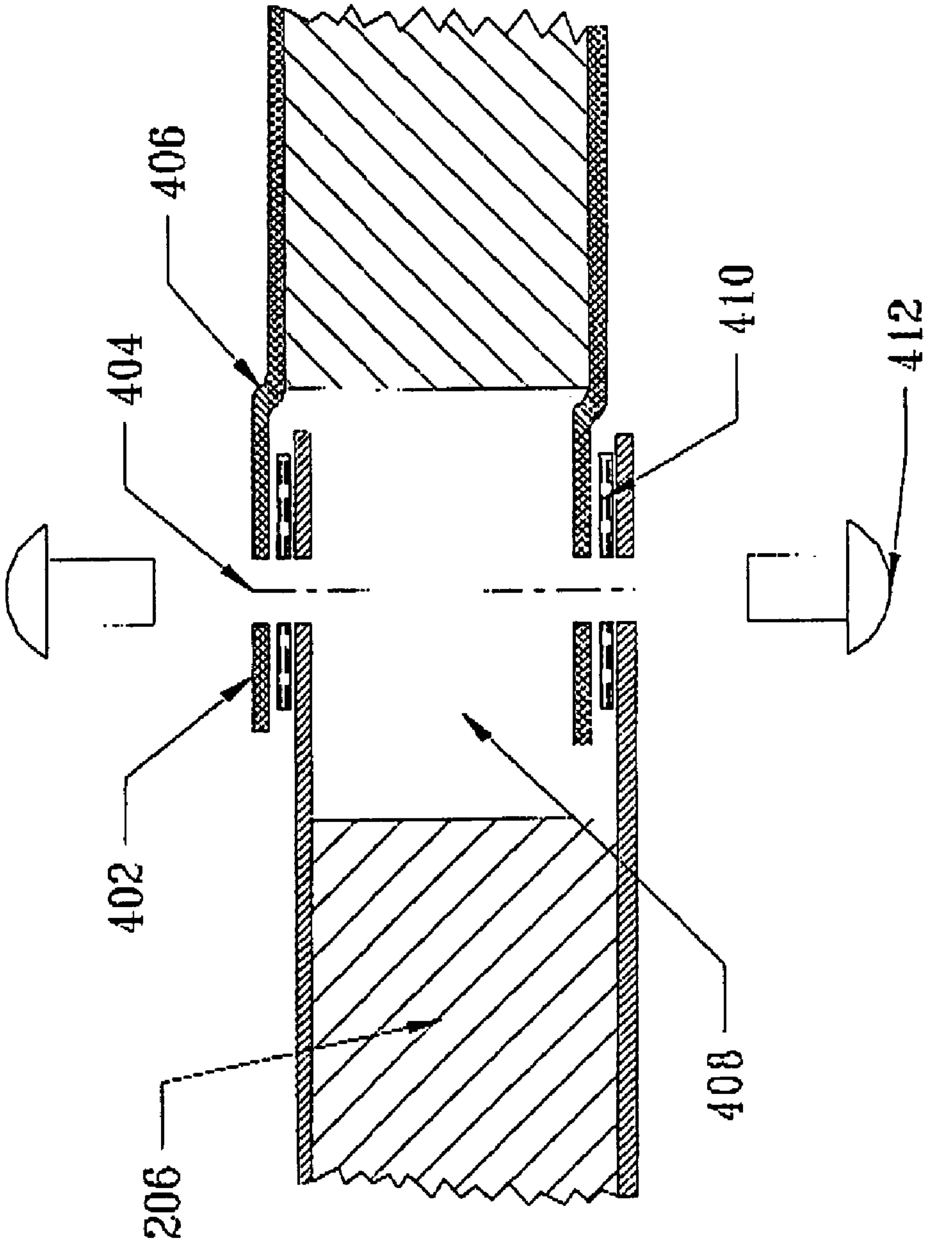
FIG. 4 illustrates a modification of the aforesaid methodology for semipermanently assembling the plurality of petallike segments.

FIG. 4 illustrates a modification of the aforesaid methodology for semi-permanently assembling the plurality of petal-like segment. The vertically upstanding butt ribs 210 are substituted by outwardly protruding lateral edges 402 of both the top and bottom skins. This modification is particularly suitable for applications where the concentrator 100 can be permanently assembled, with no requirement for mobility. The lateral edges 402 have a multitude of pre-manufactured perforations 404 at spaced intervals and a joggle 406 with an offset distance equal to the thickness of the skin. The segment's low-density core 206 is recessed from the opposite lateral edge of the skin by a distance equal to the protrusion of the upper and lower skins, forming space 408 there between. The segments are joined by means of inserting the protruding edges 402 into the space 408 on the adjacent segment, and positioning the joggled back surface on top of the adjacent segments outer surface. The segments are secured by means of blind fasteners 412 or a suitable adhesive 410, or a combination of both. The spacing and size of the blind fasteners is determined by applying Finite Element Analysis to the limiting structural load condition, thus deriving the size and frequency of the blind fastener distribution.

Figure 5:
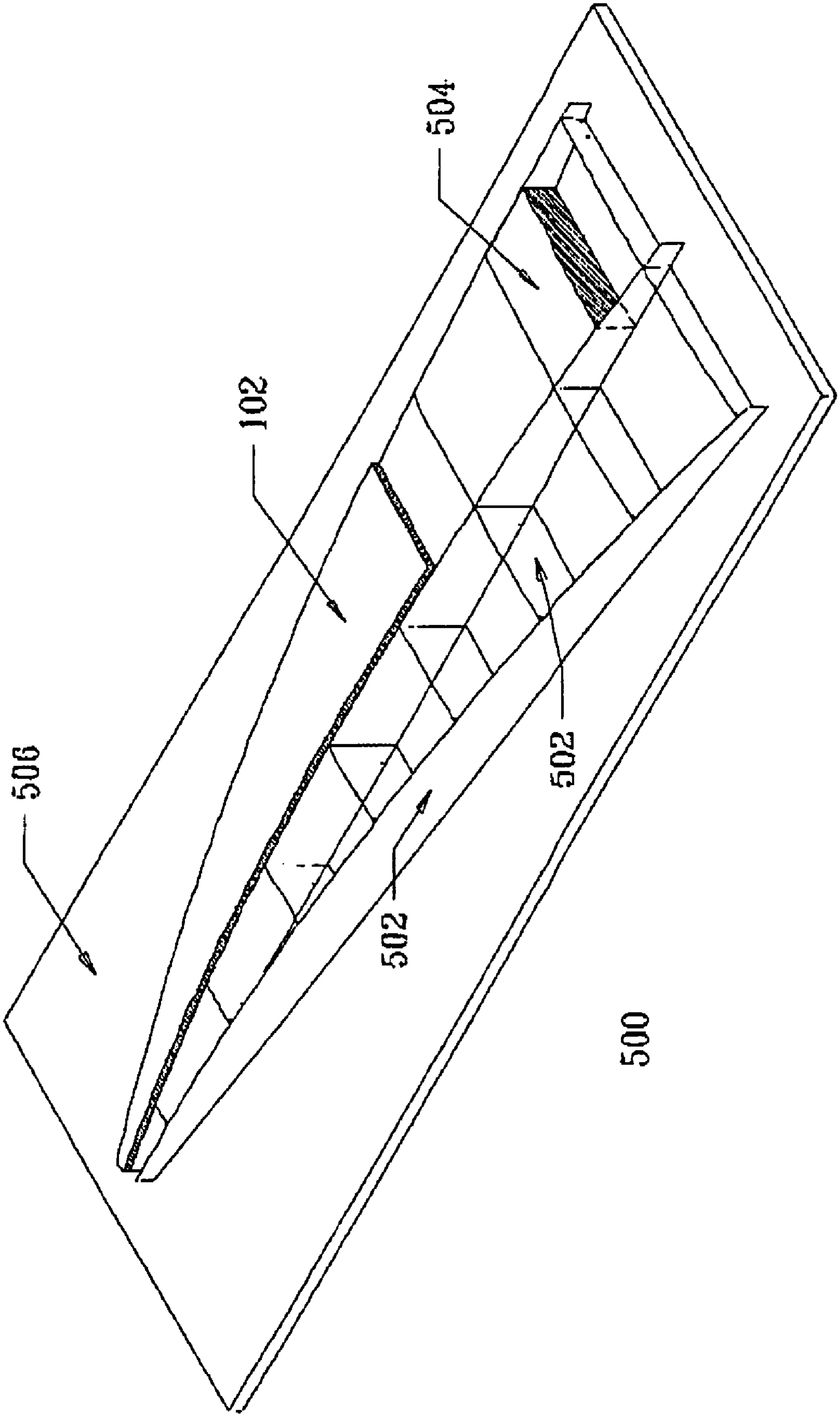
FIG. 5 shows a cutaway perspective view of the male mold assembly 500.

FIG. 5 shows a cut-away perspective view of the male mold assembly 500, which creates an exacting supporting base for the concentrator segments 102. The mold 500 enables each and all segments 102 repetitively to acquire their curved shape during the resin curing process, producing a plurality of identical and interchangeable concentrator segments 102. It will be appreciated that the male mold comprises of a plurality of laser cut longitudinal and lateral vertically upstanding templates 502 assembled on a jig plate cast to a high surface accuracy. Conformal shaped foam blocks 504 fill the void between the said templates 502. It should be noted that the aforesaid templates 502 constitute discrete sections of a true paraboloid surface of revolution. The vertically upstanding butting templates thus constitute the radial edges of the male mold 500, thus defining the angular fraction of the parabolic surface of revolution subtended by the male mold 500. The outwardly surface of the said male mold may be coated with a resin impregnated fine weave fabric, suitably fitted and polished to a mirror-like appearance. Whilst manufacturing aforesaid mold 500 a laser cut female template may be used as means to achieve the hereinabove described manufacturing accuracy of typically ±0.5 mm. It will be appreciated that the aforesaid accuracies are regularly achieved in the field of manufacturing wings for high performance manned sailplanes.

In a modification, the outwardly surface of the mold may be coated with an excessively thick structural layer. The excess of said layer may be trimmed by means of CNC milling to exacting tolerances of ±0.1 mm, thus generating a male mold with a most accurate surface distribution for the purpose of manufacturing reflective petal-like segment for the most optically demanding applications.

Figure 6:
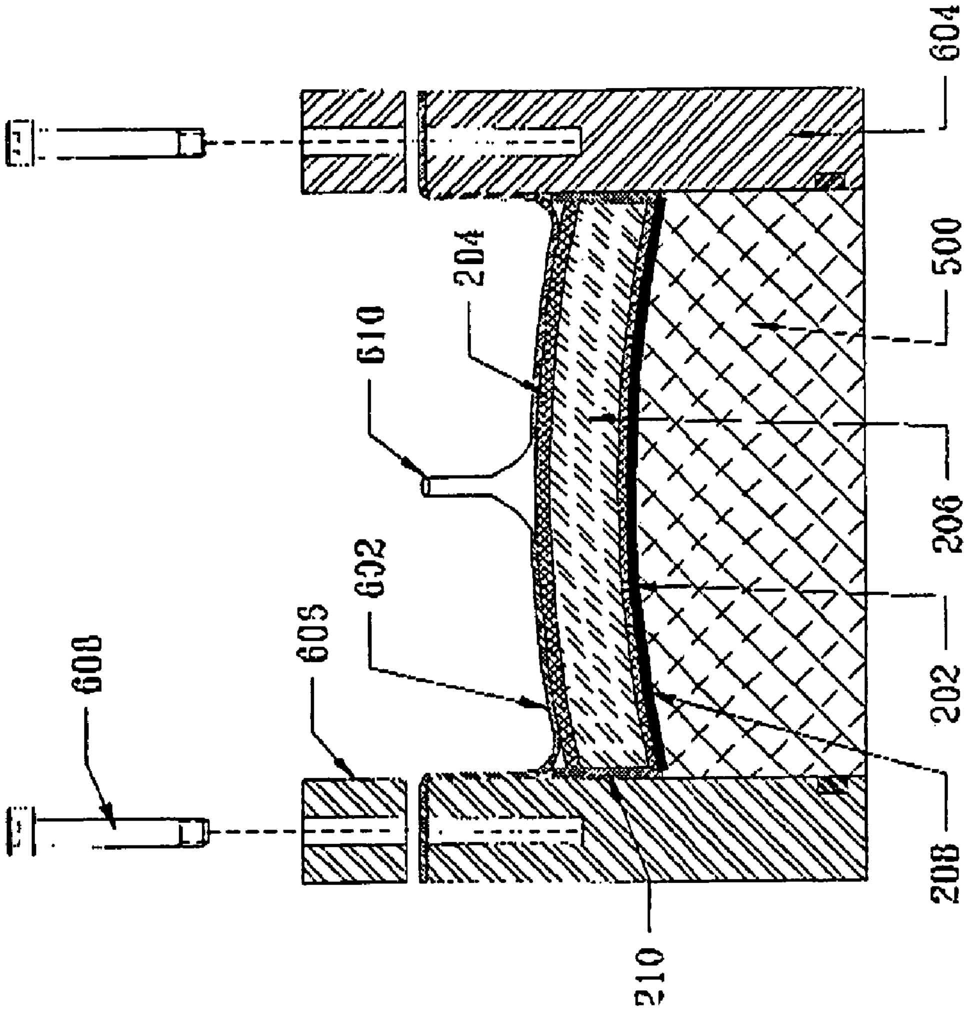
FIG. 6 shows a schematic sectional view of the embodiment for accurately affixing the reflecting surface 208 to the male mold 500 whilst fabricating the stressed monocoque structure.

FIG. 6 shows a schematic sectional view of the embodiment for accurately affixing the reflecting surface 208 to the mate mold 500 whilst fabricating the stressed monocoque structure, ultimately producing a compound parabolic segment after the termination of the resin curing process. The stressed anterior skin panels 202 are coated with resin on both sides and placed on the posterior surface of the reflective skin, the individual skin panels overlapping at the mutual joints for continuous transfer of the stress flows. A shaped low-density core 206 is placed on the resin coated posterior surface of the anterior stressed skin for the purpose of augmenting the segments area moment of inertia. A coat of resin is applied to posterior exposed surface of the low-density core.

Ultimately a plurality of posterior stressed skin panels 204 are positioned on the resin coated foam core surface. Analogously to the stressed anterior skin panels, the posterior skin panel joints mutually overlap for the purpose of continuous transfer of the stress flows.

The resulting sandwich section is compressed for the purpose of complete adhesion and conformity to the compound parabolic surface defined by the male mold 500 by virtue of a flexible membrane 602, typically silicone, subjected to a pressure differential between its interior and exterior surfaces. The lateral edges of the flexible membrane 602 are scaled against a detachable base structure 604 by means of a continuous frame 606 applying sufficient clamping pressure by means of a multitude of fasteners 608 suitably dispersed along the rim of said frame 606. The aforementioned base structure 604 is temporarily affixed to the male mold by bolts or clamps (not shown). The aforesaid pressure differential may be applied to the membrane's inner surface by means of a vacuum fitting 610 connected to a low-pressure source, typically a vacuum pump (not shown). It may be appreciated that said low pressure source whilst generating a pressure differential of approximately one atmosphere generates a uniform pressure distribution on the curing sandwich panel segment of 10 metric tons per square meter relative the underlying male mold 500. After concluding the predetermined time period for the complete curing of the resin in the bonding process, the low-pressure source is turned off and the flexible membrane 602 removed from the cured parabolic segment. The base structure 604 is disassembled from the male mold 500, and the manufactured segment is removed from said male mold, thus concluding the manufacturing process.

Figure 7:
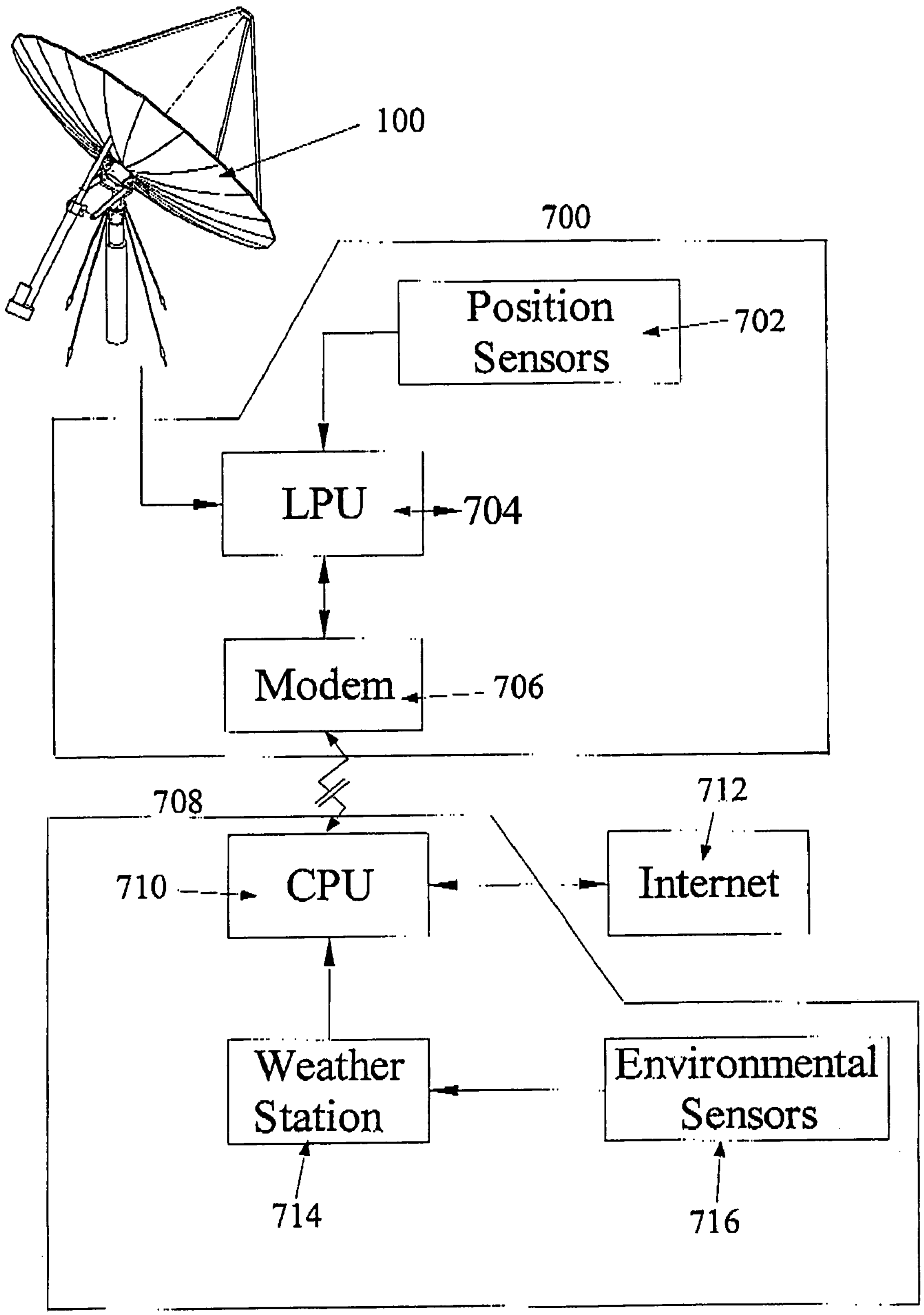
FIG. 7 is a schematic diagram showing the principal components of the radiation concentrating system.

Referring now to FIG. 7, which is a schematic diagram showing the principal components of the radiation concentrating system and the associated peripheral apparatus for typical operation of the present invention in the context of a comprehensive energy collection system. A local processing unit (LPU) 704 continuously monitors and controls the operation of a unit energy concentrator 100, by executing a sequence of real-time algorithms for the closed loop tracking of the radiation source's celestial motion based on received measurements from position sensors 702. Said LPU 704 communicates by means of a modem 706 with a remote control station's Central Processing Unit (CPU) 710, which supervises the overall operation when a plurality of concentrator units are operated simultaneously. The dual way data stream may be by means of cable, fiber optics or wireless transmission either by direct data link 708 or via an Internet relay site 712. All pertinent operational data is continuously displayed and recorded at the central control station It may be appreciated that protecting the concentrator 100 from damage due to extremely strong winds and/or hailstorms is one of the necessary functions or the CPU 710. The manner in which the said goal is achieved is by interfacing the CPU with a weather station 714, comprising of means to collect both local and remote meteorological data by a plurality or local environmental sensors 716 and wireless routes to remote meteorological databases.

Whilst the above has been given by way of illustrative embodiment of the invention, all such variations and modifications thereto as would be apparent to persons skilled in the art are deemed to fall within the broad scope and ambit of the invention as defined in the appended claims.

What is claimed is:

1. A parabolic dish-shaped electromagnetic wave front concentrator composed of a plurality of petal like segments, each segment comprising, in compact overlying position:

an anterior concave layer made of a reflective material, an anterior skin made of structural material having a Modulus or Elasticity exceeding 150 GPa, an inner low density core, a posterior skin made of structural material having a Modulus of Elasticity exceeding 150 GPa; and means for assembling the segments to each other.

2. The concentrator of claim 1 wherein the thickness of anterior and posterior skins is optimally determined in accordance with safety margins constraints due to potential structural loads and optical performance limitations due to potential structural deformations.

3. The concentrator of claim 1 wherein the thickness of the inner core is determined optimally in accordance with deflection analysis and stress analysis for meeting structural safety margin limitations at maximum operational load conditions and optical requirements for maintaining energy concentration properties.

4. The concentrator of claim 1 wherein the segments are identical.

5. The concentrator of claim 4 wherein the segments are interchangeable.

6. The concentrator of claim 1 wherein the posterior skin is coated by a protective coating.

7. The concentrator of claim 6 wherein the protective coating is zinc.

8. The concentrator of claim 1 wherein the said inner core is made of a low-density material.

9. The concentrator of claim 1 wherein the said core is made of foam materials.

10. The concentrator of claim 9 wherein the said core includes integral hollow channels.

11. The concentrator of claim 1 wherein the foam material is expanded or extruded polystyrene.

12. The concentrator of claim 1 wherein the said core is of a honeycomb structure (such as Nomex).

13. The concentrator of claim 1 wherein the said skins are made of a ferrous material.

14. The concentrator of claim 1 wherein the said assembling means comprise of a pair of butting ribs attached alongside the radial edge of each segment, the ribs being of a height exceeding the thickness of the respective segment so that a marginal portion of the abutting rib extends beyond the surface of the anterior and posterior skins, means being provided for fastening the marginal portions of abutting ribs to one another.

15. The concentrator of claim 1, wherein the anterior and posterior surfaces construction is designed to absorb predefined strains and stresses originating from mass, thermal, inertia and aerodynamic loads.

16. The concentrator of claim 1 wherein the lateral sides of the anterior and the posterior surfaces protrude outwardly relative to a radial edge, said radial edge including a plurality of perforations parallel to its lateral edge.

17. The concentrator of claim 1, further comprising:

a control means for continuously aligning the concentrator's optical axis for attaining an optimal position relative to an incident wave front of energy, a fixed upright means for supporting the concentrator, and a radiation energy receiving/converting means.

18. The concentrator of claim 1 further comprising a weather data acquisition unit, position sensors and a processing unit, whereby the streaming operational parameters provided by a plurality of sensors are acquired, stored and reported to a remote control station.

19. The concentrator of claim 18 wherein the processing unit is programmed to place the concentrator in a protective position with regards to a pre-determined type of adverse weather conditions if the operational environmental limitations, as received by the weather data acquisition unit, have exceeded pre-defined values.

20. The concentrator or claim 18 wherein the weather data acquisition unit acquires the environmental information in real time from a plurality of local weather sensors or from a remote data information source or remote database.

21. The concentrator of claim 18 wherein the weather data acquisition unit is a designated self integrated circuit card mounted on the motherboard of the processing unit, wherein all streaming acquired environmental data is processed and an algorithm is executed for determining if limiting weather conditions are reached, whereby appropriate instructions are transferred to the processing unit.

* * * * *